United States Patent [19]

Lynch

[11] Patent Number: 4,771,737

[45] Date of Patent: Sep. 20, 1988

[54] ADJUSTABLE HEADLOCK USABLE WITH A LIVESTOCK PEN

[76] Inventor: John P. Lynch, c/o Sydell, Inc., P.O. Box 85, Rural Rt. 1, Burbank, S. Dak. 57010

[21] Appl. No.: 911,634

[22] Filed: Sep. 25, 1986

[51] Int. Cl.$^4$ .............................................. A01D 3/00
[52] U.S. Cl. ........................................ 119/99; 119/98
[58] Field of Search ........... 119/99, 98, 147 R, 147 A, 119/149, 150; 17/44

[56] References Cited

U.S. PATENT DOCUMENTS

| | | | |
|---|---|---|---|
| 2,833,248 | 6/1956 | Meyer et al. | 119/98 |
| 2,997,982 | 8/1961 | Trogdon | 119/147 |
| 3,043,269 | 2/1961 | Kausche | 119/99 |
| 3,538,890 | 11/1970 | Torell | 119/98 |
| 3,691,998 | 9/1972 | Luinstra | 119/98 |
| 3,814,060 | 5/1974 | Swenson | 119/98 |
| 4,302,908 | 12/1981 | Parker | 119/98 |
| 4,579,084 | 4/1986 | McCan et al. | 119/98 |

Primary Examiner—Robert P. Swiatek
Assistant Examiner—R. Thomas Price
Attorney, Agent, or Firm—Lucas J. De Koster

[57] ABSTRACT

A headlock device for holding the head of a domestic animal for any purpose requiring the holding of that animal. The device is built for quick and easy removal and replacement on a pen with which it is to be used. The holding mechanism is adjustable so that the device can be used on animals having different sizes of neck. The adjustment is two-fold. One is an adjustment of the holding position so that it can be used with similar animals each of which has a similar sized neck. The second adjustment is for an individual animal or to hold the headlock in its open position.

2 Claims, 2 Drawing Sheets

ADJUSTABLE HEADLOCK USABLE WITH A LIVESTOCK PEN

BACKGROUND AND SUMMARY OF THE INVENTION

This invention pertains to devices for the restraint of domestic animals. It is particularly adapted for such animals as sheep and goats; but can also be used for cattle or the like.

Many times, it may be desirable to hold an animal by the head while performing some function on that animal. The examples used will pertain to sheep, but similar needs are present in the raising of other livestock. Among the functions are those of milking a ewe; giving medication to the animal; identification marking; etc. It may also be desirable to hold the head of the female animal while a young one is nursing, or to vaccinate an animal.

With larger animals such as horses or cattle, the holding may be done in a special chute which restrains the bodily movement of the animal as well as holding the head in a stanchion. With somewhat smaller animals such as sheep or goats, the restraint on the body may not be so necessary, and if the head alone can be held, the restraint may be enough. Therefore, such holding could be done in a pen where the animal—especially a nursing ewe or doe—is confined with its young.

My device is designed for use in a pen having rails defining openings at approximately the level of the head of the animal being confined. I provide an easy and quick method of mounting the head lock onto those rails. I also provide for an adjustable opening in the lock so that it is adaptable for use with various sizes of animal.

FIGURES

DESCRIPTION

Briefly my invention comprises a headlock for the restraint of an animal. The device includes hook-like bars for quick attachment to pen rails, and a pair of substantially parallel, vertically extending bars movable toward and away from each other. The distance between the bars can be adjusted to a series of fixed positions depending on the thickness of the neck of the specific animal.

Figure 1:
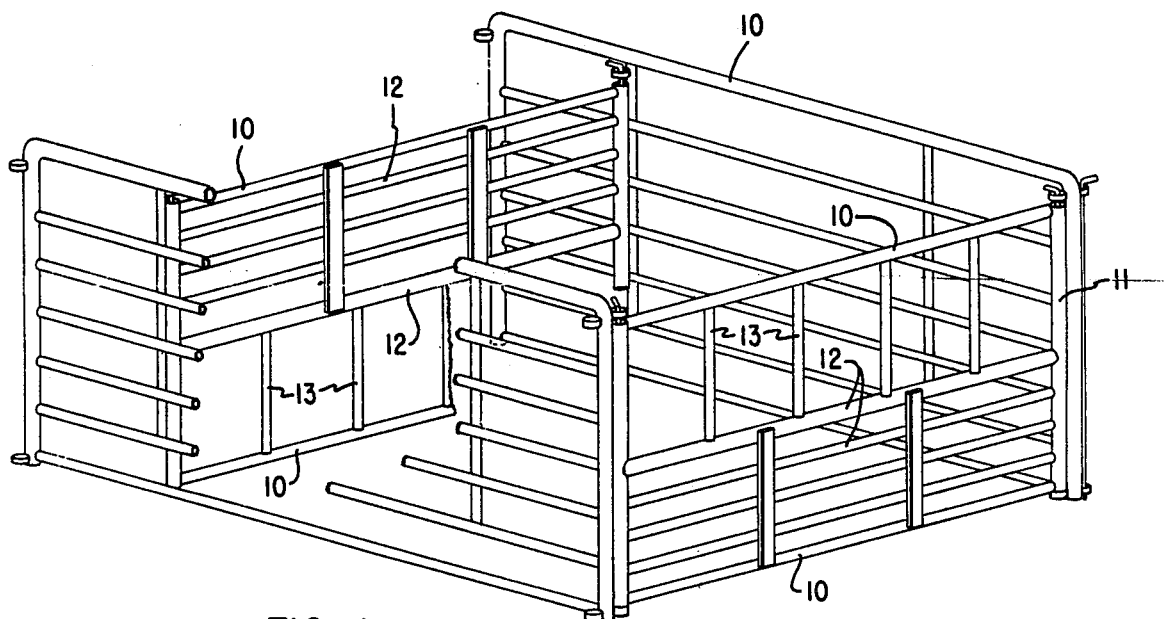
FIG. 1 is a perspective view of a pen to which my device may be affixed.
Figure 3:
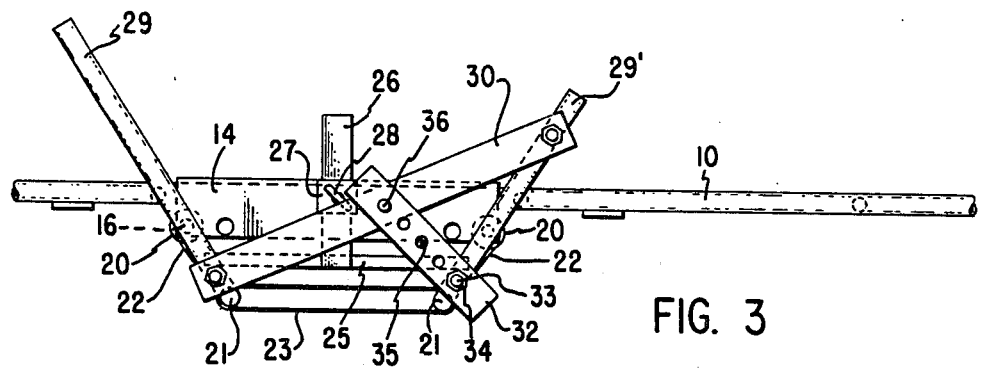
FIG. 3 is a top plan view of the device in an adjusted closed position.

More specifically, and referring to the drawings, I propose to use my device on a pen similar to that shown in FIG. 1. This pen may be formed of horizontal members 10 connecting vertical corner posts 11. Intermediate rails, both horizontal rails 12 and vertical members 13 may be used to provide restraint for any animal placed in the pen. These pens are sometimes used side by side, and the larger openings between the vertical members 13 and horizontal rails 12 may be of such size as to allow free passage for young animals which are smaller while restricting passage of the larger adults. In FIG. 1 I illustrate this idea by showing such a configuration at the rear of the pen. On the front, the larger openings at the top provide openings through which an adult animal can extend its head. Watering devices or feeding troughs or pans may be placed outside of these openings for feeding and watering the adult animals. At the rear, the larger openings are at the ground or floor level and the lambs or other small animals can move readily from the larger pen in front to the smaller area at the rear of the pen. The larger animal could not move there and thus, the smaller animal could be protected from being laid on by the mother animal.

Figure 4:
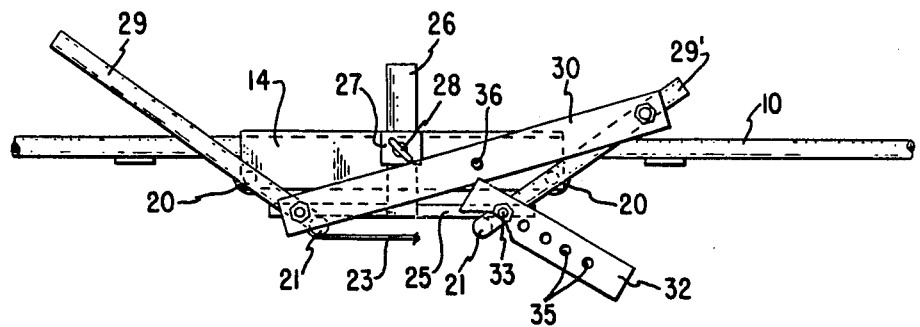
FIG. 4 is a view similar to FIG. 3 with the device in its released position.
Figure 5:
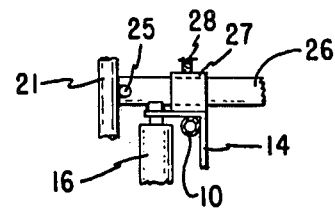
FIG. 5 is a detailed partial view from line 5—5 of FIG. 2.
Figure 2:
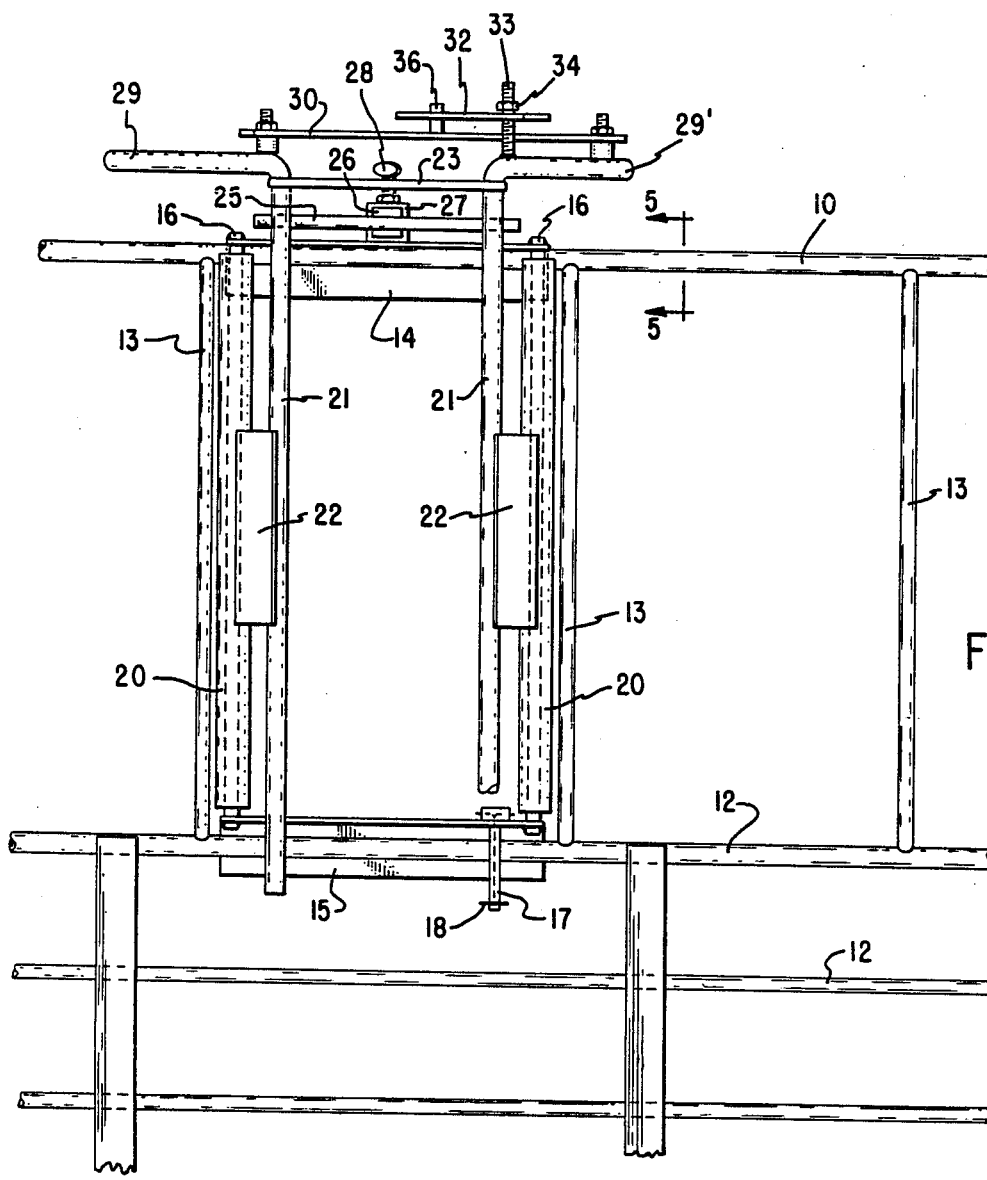
FIG. 2 is a front elevational view of the device in place on the pen.

My device is adapted to be used in one of the larger openings such as shown on the upper part of the right front side in FIG. 1. As best shown in FIGS. 2 and 5, my device has an upper frame member 14 and a lower member 15, both of which are preferably formed of angle iron material to which are fastened vertical rods 16. These rods 16 are fixed to the horizontal flange of the angle iron frame members 14 and 15, and are spaced from the vertical flange of those members by a distance such that a horizontal member 10 or rail 12 will fit reasonably closely between the vertical flange and the rod thus forming a channel shape in which the member 10 or rail 12 can be disposed. As an alternative to the extension of the rod 16 at the lower end, I can provide auxiliary vertical posts 17. These posts may also carry collars 18 or the like to restrict vertical movement of the device which might cause it to become disengaged from the horizontal member 10 and rail 12. Thus a channel-shaped member is formed between the post 17 and the vertical flange of the frame member 15.

Movable gates for the device include pipe or tube-like pivotal members 20 surrounding the rods 16 so that the pivotal members can rotate relative to the rods. The vertical neck bars 21 are fixed to the pivot members 20 by means of a plate 22 welded to both the bars 21 and the tubular pivot members 20. Thus, I form two gates, each composed of a pivot member 20, a bar 21 and a plate 22 which holds each gate together as one piece. It will be obvious, although I show the rods 16 welded at both ends to the frame members 14 and 15, that one end of each rod could be formed with a threaded end onto which a nut or nuts could be threaded to hold the frame member. In that way, disassembly of the device for replacement of a gate or gates might be possible.

In order to bias the bars 21 to a closed position—where they are closest together, I provide for a rubber band 23 looped over the bars 21. This band can be replaced by a suitable spring or other biassing means.

It may be desirable to adjust the tightest closed position so that the neck of the general type of animal being held is not too tightly pinched. An adjustable stop means is provided to accomplish that purpose. This means includes a stop bar 25 which will engage the neck bars 21. By adjusting the position of this stop bar 25 against the neck bars 21, the pivotal motion about the rods 16 can be blocked. Thus, by moving the stop bar 25 in a direction away from the line between the ends of the rods 16, the neck bars will be prevented from closing as tightly as if the neck bar 21 were closer to that line. In order to accomplish the adjustment, I provide a tang 26 forming the upright of a T shape with the stop bar 25. This tang 26 extends adjustably through a loop 27 where a thumb screw 28 can be pressed against the tang 26 to hold a given position.

Controls for both neck bars 21 simultaneously with one hand is desirable. To accomplish that control, I provide a preferred form of gate and the controls therefor. The neck bars 21 are formed in an inverted L-shape. The legs 29 and 29' of the L shape extend substantially horizontally above the rest of the gate. The first leg 29 is extended a substantial distance so as to provide a handle by which the entire device can be controlled. A link 30 pivotally fastened to each leg provides the linkage to control one leg from the motion of the other, and by using one pivoted connection on that part of the leg 29 between the neck bar 21 and the pivot axis 16, and the other pivoted connection on the leg 29' approximately the same distance in the opposite direction from the axis 16 of the other leg, the single motion of the handle in the form of the leg 29 will cause opposite motion of the other leg 29'. This motion, therefore will cause the neck bars either to approach each other or to separate depending upon the direction of motion of the leg 29.

It may, on occasion, also be desirable to hold the head lock in an open position. For this purpose I also provide a link means including a link 32 pivotally connected to a post 33 on the leg 29'. The post 33 may be a threaded member with nuts 34 above and below the link 32 to position the link vertically. The link 32 is formed with a series of holes 35 which are adapted to fit over a peg 36 on the link 30. When the link 32 is disposed over the peg 36, there is a fixed triangle which precludes movement of the leg 29' and the link 30. Thus, the head lock device is held in that position. By spreading the peg 36 to its farthest distance from the post 33, the distance between the neck bars 21 will be at the maximum spread. At that spread, the link 32 is proportioned so that its longer part having the holes 35 will abut the edge of the link 30. In the abutting position, the devide is fully open so that the head of an animal may be readily inserted between the gate plates 22. As the head is inserted, the operator can push the leg 29 as a handle in the direction of opening. A slight movement in that direction will relieve the pressure between the end of the link 32 and the side of the link 30. The released end of the link 32, since it is no longer supported by that pressure against the link 30 will then drop of its own weight. The gates, then, are no longer held in the open position by these links and they will snap shut under urging of the band 23. In any open position other than wide open, the link 32 can be held by the peg 36.

In use, the head lock gate is mounted on the pen simply by placing the lower flanges on the angle iron frame members 14 and 15 over the upper horizontal member 10 and the horizontal rail 12. Because of the described construction, it is held in place in this position. The lock can then be opened by releasing the link 32 from the peg 36 and operating the handle leg 29. When the head of the animal is in place, the leg 29 can be released. The band 23 will pull the neck bars 21 together around the neck of the animal. When the neck bars 21 hit the stop bar 25, the closure will be stopped and the link 32 can again be engaged with the peg 36. If the neck bars 21 are either too close together or not close enough, the position of the stop bar 25 may be altered by releasing the screw 28 and sliding the tang 26 through the loop 27 and again tightening the screw 28.

Thus, I have provided a readily portable head lock gate which is fully adjustable and easy to use.

I claim as my invention:

1. For use on a pen having a rectangular opening between horizontal bars and vertical bars, said horizontal bars including an upper bar, a middle bar and a lower bar, said middle bar being located approximately midway between said upper bar and said lower bar; a headlock gate comprising upper and lower frame members, said members being formed in a channel shape engageable with said upper bar and said middle bar respectively, a pair of gate means pivotally mounted on said frame means, said gate means being adapted to move toward each other to a closed position and away from each other to an open position, biasing means connected to said gate means to urge said gate means to a closed position and stop means including a tang member slidably adjustable on said upper frame member, said tang member including a cross bar in position to engage said gate means to prevent said gate means from coming to a completely closed position and thereby to provide that the closed position of said gate means is adjustable.

2. The head-lock gate of claim 1 in which said head-lock gate is mounted in the rectangular opening in one of the four sides of said pen, said side being invertible whereby said opening will provide passage for small animals such as the young of the animal to be held.

* * * * *